United States Patent Office 3,790,624
Patented Feb. 5, 1974

3,790,624
OXIDATION OF ALKYL-SUBSTITUTED
AROMATIC COMPOUNDS
Stephen N. Massie, Palatine, and Herman S. Bloch, Skokie, Ill., assignors to Universal Oil Products Company, Des Plaines, Ill.
No Drawing. Filed Mar. 24, 1972, Ser. No. 237,943
Int. Cl. C07c 45/02, 47/52, 63/02
U.S. Cl. 260—524 R    11 Claims

ABSTRACT OF THE DISCLOSURE

The alkyl-substituted aromatic compounds, and particularly alkyl-substituted aromatic hydrocarbons, are treated with an oxygen-containing gas in the presence of a catalyst comprising a mixture of a transition metal compound and a hypochlorite compound to obtain improved yields of the desired oxygenated aromatic compounds.

---

This invention relates to a process for preparing oxygenated aromatic compounds. More particularly, the invention is concerned with a process for obtaining improved yields of oxygenated aromatic compounds by treating an alkyl-substituted aromatic compound with an oxygen-containing gas in the presence of certain catalytic compositions of matter of a type hereinafter set forth in greater detail.

Oxygenated aromatic compounds such as alcohols, aldehydes, and acids constitute an important class of chemical compounds which are useful for a variety of purposes in the chemical industry today. For example, benzaldehyde is useful in organic syntheses, especially for dyes and dye intermediates. In addition, it may also be used as a solvent for oils, resins, cellulose ethers, cellulose acetate and cellulose nitrate. Other uses for this important compound will include its use in flavoring compounds, in the production of synthetic perfumes, in the manufacture of cinnamic acid, in toilet preparations and soaps, in photographic chemicals, in baking chemicals and medicine. Benzoic acid which is another oxygenated aromatic compound which may be prepared according to the process of this invention is used as a mordant in calico printing, in seasoning tobacco and improving the aroma thereof, in flavors, in dentifrices, in medicines as a germicide, in food packaging, in textiles, in dyes, and also as a plasticizer and resin intermediate. Likewise, the isomeric phthalic acids are important chemical compounds; ortho-phthalic acid (also known as phthalic acid) being used in dyes such as the synthesis of indigo, the manufacture of phthaleins, various fluorescein and eosine dyes, rhodamines and pyronine dyes, in medicine and in synthetic perfumes. The anhydride of this acid is used in the preparation of alkyl resins, plasticizers, polyesters and as an intermediate in the preparation of pharmaceuticals and insecticides. Isophthalic acid is also used as a component in polyesters and polyurethane resins. Para-phthalic acid, also known as terephthalic acid, is an important intermediate in the production of synthetic resins, fibers and films by combination with glycols, a particularly important series of fibers being the various polyesters. Other polycarboxylic aromatic acids which may be prepared according to the process of this invention will include trimellitic or pyromellitic acid, these acids and the anhydrides thereof such as trimellitic anhydride being useful as plasticizers in the preparation of water based resins, epoxy molding compounds, etc. As an example of the first stage oxidation product which may be obtained according to the process of this invention, benzyl alcohol is a useful chemical compound which is used as a solvent in perfumery and flavoring materials, as an intermediate in preparing other benzyl esters and ethers, as a high boiling solvent in cellulose derivatives production, as a solvent for cellulose esters and ethers, and as an intermediate or component in resins, lacquers and films, as well as paint and varnish removers.

It is therefore an object of this invention to provide a process for the oxidation of alkyl-substituted aromatic compounds.

A further object of this invention is to provide an improvement in a process for preparing oxygenated aromatic compounds whereby increased yields of the desired products will be obtained thereby.

In one aspect an embodiment of this invention resides in a process for the oxidation of alkyl-substituted aromatic compounds which comprises treating said alkyl-substtiuted aromatic compound with an oxygen-containing gas at oxidation conditions in the presence of a catalyst comprising a mixture of a transition metal compound and hypochlorite compound, and recovering the resultant oxygenated aromatic compounds.

A specific embodiment of this invention is found in a process for the oxidation of alkyl-substituted aromatic compounds which comprises treating toluene with air at a temperature in the range of from about 100° to about 250° C. and a pressure in the range of from about 250 to about 2,000 pounds per square inch in the presence of a catalyst comprising a mixture of cobalt acetate and aqueous sodium hypochlorite, and recovering the resultant mixture of benzaldehyde, benzyl alcohol, and benzoic acid.

Other objects and embodiments will be found in the following further detailed description of the present invention.

As hereinbefore set forth the present invention is concerned with a process for the oxidation of alkyl-substituted aromatic compounds and particularly with a process whereby an alkyl-substituted hydrocarbon is treated with an oxygen-containing gas in the presence of certain catalytic compositions of matter of a type hereinafter set forth in greater detail. The oxidation of the alkyl-substituted aromatic compound will result in the obtention of first, second and third stage oxidation products, namely, alcohols, aldehydes, and acids. Examples of alkyl-substituted aromatic compounds which may undergo oxidation to form the corresponding or dissimilar alcohols, aldehydes and acids will include both mono- and poly-substituted aromatic compounds such as toluene, ethylbenzene, n-propylbenzene, n-butylbenzene, n-amylbenzene, o-xylene, m-xylene, p-xylene, o-diethylbenzene, m-diethylbenzene, p-diethylbenzene, o-dipropylbenzene, m-dipropylbenzene, p-dipropylbenzene, mesitylene, pseudocumene, hemimillitene, durene, isodurene, prehnitene, pentamethylbenzene, hexamethylbenzene, 1-methylnaphthalene, 2-methylnaphthalene, 1-ethylnaphthalene, 2-ethylnaphthalene, 1 - n-propylnaphthalene, 2-n-propylnaphthalene, 1,2-dimethylnaphthalene, 1,2-diethylnaphthalene, 1-methylanthracene, 2-methylanthracene, 1-ethylanthracene, 2-ethylanthracene, etc. It is also contemplated within the scope of this invention that alkyl-substituted aromatic compounds which contain a chloro substituent such as o-chlorotoluene, m-chlorotoluene, p-chlorotoluene, o-chloroethylbenzene, m-chloroethylbenzene, p-chloroethylbenzene, etc. may also undergo oxidation according to the process of this invention although not necessarily with equivalent results. Also, certain polycyclic aromatic compounds which may undergo oxidation of one of the rings to form polycarboxylic acids may be oxidized according to the process of the invention. Such compounds include naphthalene, indane, tetralin, cyclohexylbenzene, phenanthrene, anthracene, etc.; but not necessarily with equivalent results. It is also to be understood that the aforementioned alkyl-substituted aromatic compounds are only representative of the classes of compounds which may be subjected to the oxidation reaction described herein, and that the present invention is not necessarily limited thereto.

The oxidative reaction conditions under which the process of the present invention is effected will include elevated temperature, preferably in a range of from about 100° to about 250° C. or more and a pressure ranging from 250 up to about 2,000 pounds per square inch or more. The superatmospheric pressure will be afforded by the oxidation agent which is utilized to prepare the desired product, said oxidation agent comprising an oxygen-containing gas such as air or oxygen, the former constituting the preferred oxidation agent due to the greater availability and lower cost thereof. As an alternative it is also contemplated that the oxidation agent may provide only a partial pressure of the desired operating pressure, the remainder of said pressure being formed by the introduction of a substantially inert gas such as nitrogen into the reaction zone.

As hereinbefore set forth, the oxidation reaction of the present invention is effected in the presence of certain cataltyic compositions of matter whereby a greater yield of the desired product or products may be obtained as well as affording an improvement in the rate of reaction. The desired composition of matter will comprise a mixture of a transition metal-containing compound in which the metal is selected from the group consisting of manganese, cobalt, nickel, iron, vanadium, titanium, molybdenum and tungsten. The preferred anion in the compound will be derived from an organic acid, specific examples of these transition metal-containing compounds including manganese acetate, manganese propionate, manganese butyrate, manganese valerate, manganese 2-ethylhexanoate, manganese benzoate, manganese toluate, manganese naphthenate, cobalt acetate, cobalt propionate, cobalt butyrate, cobalt valerate, cobalt 2-ethylhexanoate, cobalt benzoate, cobalt toluate, cobalt naphthenate, nickel acetate, nickel propionate, nickel butyrate, nickel valerate, nickel 2-ethylhexanoate, nickel benzoate, nickel toluate, nickel naphthenate, iron acetate, iron propionate, iron valerate, iron 2-ethylhexanoate, iron benzoate, iron toluate, iron naphthenate, vanadium acetate, vanadium propionate, vanadium valerate, vanadium 2-ethylhexanoate, vanadium benzoate, vanadium toluate, vanadium naphthenate, titanium oxalate, titanium oxyacetylacetonate, molybdenum acetate, molybdenum propionate, molybdenum butyrate, molybdenum valerate, molybdenum 2-ethylhexanoate, molybdenum benzoate, molybdenum toluate, molybdenum naphthenate, tungsten acetate, tungsten propionate, tungsten valerate, tungsten 2-ethylhexanoate, tungsten benzoate, tungsten toluate, tungsten napththenate, etc.

The second component of the catalytic composition of matter will comprise a hypochlorite compound in which the metal portion of the compound will comprise an alkali metal or alkaline earth metal. Specific examples of these hypochlorite compounds include sodium hypochlorite, potassium hypochlorite, calcium hypochlorite, lithium hypochlorite, magnesium hypochlorite, barium hypochlorite, etc. In addition other hypochlorite compounds which may be used will include tertiary alkyl hypochlorites such as t-butyl hypochlorite, t-amyl hypochlorite, etc. The alkali metal or alkaline earth hypochlorite compounds are preferably utilized in an aqueous solution, the amount of the hypochlorite present in the aqueous solution ranging from about 0.5% up to the saturation point of the particular hypochlorite compound in the solution. Alkyl hypochlorites are preferably utilized in solution in the alkylaromatic compound which is to be oxidized.

It is also contemplated that the catalytic composition formed by the interaction of a compound of one of the aforementioned transition metals and a hypochlorite compound may be formed, separated and purified piror to introduction into the oxidation apparatus.

It is also contemplated within the scope of this invention that the oxidation reaction may be effected in the presence of certain oxidation-resistant solvents such as water, methyl alcohol, ethyl alcohol, n-propyl alcohol, acetic acid, propionic acid, butyric acid, etc., although not necessarily with equivalent results.

The process of this invention may be effected in any suitable manner and may comprise either a batch or continuous type operation. For example, when a batch type operation is used, a quantity of the starting material comprising the alkyl-substituted aromatic compound is placed in an appropriate apparatus which may comprise a flask or, in the preferred embodiment of the invention when superatmospheric pressures are to be employed, an autoclave of the rotating or mixing type. In addition, the apparatus will also contain the catalytic composition of matter comprising a mixture of the transition metal-containing compound and the hypochlorite compound. Thereafter the oxidation agent comprising an oxygen-containing gas is charged to the reactor until the desired operating pressure is obtained, following which the apparatus is then heated to the desired operating temperature. Upon completion of the desired residence time which may range from 0.5 up to about 20 hours or more in duration, heating is discontinued, the apparatus is allowed to return to room temperature, and the excess pressure is discharged. The reaction mixture is thereafter recovered from the apparatus and subjected to conventional means of separation and purification which will include washing, drying, extraction, fractional distillation, etc. whereby the desired oxygenated products which comprise alcohols, aldehydes and acids are recovered and separated.

It is also contemplated within the scope of this invention that the process may be effected in a continuous manner of operation. When such a type of operation is used the alkyl-substituted aromatic compound is continuously charged to the reaction vessel which is maintained at the proper operating conditions of temperature and pressure. The catalytic composition of matter may, if so desired, be charged to the reaction vessel in a separate stream or may be admixed with the alkyl-substituted aromatic compound and the resulting mixture charged thereto in a single stream. In addition the oxidation agent comprising an oxygen-containing gas such as air or oxygen is also continuously charged to the reaction vessel through a separate stream as is the solvent, if one is utilized in the reaction. Upon completion of the desired residence time, the reactor effluent is continuously discharged and subjected to separation means similar in nature to those hereinbefore set forth whereby the desired oxygenated products comprising alcohols, aldehydes and acids are recovered, while any unreacted starting materials and catalysts are recycled to the reaction zone to form a portion of the feed stock.

The following examples are given to illustrate the process of the present invention which, however, are not intended to limit the generally broad scope of the present invention in strict accordance therewith.

EXAMPLE I

In this experiment 60 g. of toluene along with 1 g. of manganese benzoate and 30 g. of an aqueous solution of 5.25 wt. percent sodium hypochlorite were placed in the glass liner of a rotating autoclave. The glass liner was sealed into a rotating autoclave of 850 cc. capacity, pressed with 525 pounds per square inch of air and heated to a temperature of 180° C. The autoclave and contents thereof were maintained at this temperature for a period of 8 hours, the maximum pressure at this temperature reaching 760 pounds per square inch. At the end of the 8-hour period, heating was discontinued and the autoclave allowed to return to room temperature, the final pressure at room temperature being 465 pounds per square inch. The autoclave was opened and the reaction mixture recovered therefrom. The liquid product mixture was separated, weighed and submitted to quantitative gas-liquid chromatographic analysis, the oxidized product comprising 64 mmoles of benzaldehyde, 54 mmoles of benzyl alcohol and 184 mmoles of benzoic acid per mole of oxygen charged to the reactor.

EXAMPLE II

To illustrate the necessity for the presence of a hypochlorite compound, the above experiment was repeated by charging 60 g. of toluene to the glass liner of a rotating autoclave along with 1 g. of manganese benzoate and 30 g. of water. The liner was sealed into the autoclave and air pressed in until an initial operating pressure of 525 pounds per square inch was reached. The autoclave was then heated to a temperature of 180° C. and maintained thereat for a period of 8 hours, the maximum pressure at this temperature reaching 820 pounds per square inch. At the end of the aforesaid reaction time, heating was discontinued and the autoclave allowed to return to room temperature, the final pressure at room temperature being 460 pounds per square inch. The excess pressure was discharged, the autoclave was opened and the reaction mixture recovered therefrom. The liquid product was recovered, weighed and submitted to quantitative gas-liquid chromatographic analysis. This analysis disclosed the fact that there was 32 mmoles of benzaldehyde, 2 mmoles of benzyl alcohol and 41 mmoles of benzoic acid obtained per mole of oxygen charged to the reactor. It is thus noted that the total production of benzylic radicals was 200% greater then when utilizing a mixture of manganese benzoate and aqueous sodium hypochlorite than was obtained when using the manganese benzoate-water catalyst system.

EXAMPLE III

A mixture of 60 g. of toluene, 2 g. of cobalt acetate hydrate, 1.6 g. of sodium hypochlorite and 30 g. of water was placed in the glass liner of a rotating autoclave which was thereafter sealed into the autoclave. Air was pressed in until an initial operating pressure of 525 pounds per square inch was reached, after which the autoclave was heated to a temperature of 180° C. for a period of 8 hours, the maximum pressure at this temperature reaching 780 pounds per square inch. At the end of the 8-hour period, heating was discontinued and the autoclave allowed to return to room temperature, the final pressure at this temperature being 429 pounds per square inch. The excess pressure was discharged, the autoclave was opened, and the reaction mixture recovered therefrom. The liquid product mixture was separated, weighed and submitted for quantitative gas-liquid chromatographic analysis which disclosed that the product comprising 344 mmoles per mole of oxygen charged to the reactor was made up of 5 mmoles of benzyl alcohol, 57 mmoles of benzaldehyde, 281 mmoles of benzoic acid and 1 mmole of benzyl benzoate.

In contrast to this, when the above experiment was repeated in the absence of sodium hypochlorite but under otherwise similar conditions, the product contained no detectable benzyl alcohol and considerably less benzaldehyde, and consisted mainly of benzoic acid in an amount less than found above.

EXAMPLE IV

A mixture comprising 60 g. of p-xylene, 2 g. of manganese benzoate and 1.5 g. of calcium hypochlorite along with 30 cc. of water is placed in the glass liner of a rotating autoclave. The liner is then sealed into the autoclave and air is pressed in until an initial operating pressure of 550 pounds per square inch is reached. Thereafter the autoclave is heated to a temperature of 180° C. and maintained thereat for a period of 8 hours, the maximum pressure at this temperature reaching approximately 775 pounds per square inch. At the end of the 8 hours, heating is discontinued and the autoclave is allowed to return to room temperature. The excess pressure is discharged, the autoclave is opened and the reaction mixture is recovered therefrom. The liquid reaction product is separated from the catalyst, the acidic products removed and converted to methyl esters, and the separate portions of the product subjected to quantitative gas-liquid chromatographic analyses, said analyses disclosing the presence of terephthalic acid, terephthalaldehyde, p-toluic acid, p-tolualdehyde, and p-methylbenzyl alcohol.

EXAMPLE V

In like manner a mixture of 60 g. of pseudocumene, 2 g. of cobalt acetate and 30 cc. of an aqueous sodium hydrochlorite solution containing 5.25 wt. percent of sodium hypochlorite is placed in the glass liner of a rotating autoclave which is thereafter sealed into the autoclave. Air is pressed in to an initial operating pressure of 525 pounds per square inch after which the autoclave is heated to a temperature of 160° C. and maintained thereat for a period of 10 hours. After the 10-hour period is completed, heating is discontinued, the autoclave is allowed to return to room temperature and the excess pressure is discharged therefrom. The autoclave is opened, the reaction mixture is recovered and the liquid product is separated from the catalyst. This product is then submitted to a series of separation steps, the acidic products esterified, and the separate product portions subjected to quantitative gas-liquid chromatographic analyses which will disclose the presence of the desired oxidized products comprising a mixture of trimellitic acid, dimethylbenzyl alcohols, 2-methylterephthalaldehyde, 2-methylterephthalic acid, 4-methylphthalic acid, 2,4 - dimethylbenzoic acid, 3,4 - dimethylbenzoic acid and 2,5-dimethylbenzoic acid.

EXAMPLE VI

To the glass liner of a rotating autoclave is charged 60 g. of 1-methylnaphthalene, 2 g. of manganese benzoate and 30 cc. of a 5.25 wt. percent sodium hypochlorite solution in water. The liner is sealed into the autoclave and air is pressed in until an initial operating pressure of 750 pounds per square inch is reached. The autoclave is then heated to a temperature of 200° C. and maintained thereat for a period of 10 hours. At the end of this 10-hour period, heating is discontinued, the autoclave is allowed to return to room temperature and the excess pressure is discharged. The autoclave is then opened and the reaction mixture is recovered therefrom. After separation of the liquid reaction product from the catalyst, the former is subjected to quantitative gas-liquid chromatographic analysis which discloses the presence of a mixture of 1-naphthoic acid, 1-naphthaldehyde and 1-hydroxymethyl naphthalene as well as a mixture of phthalic acid and hemimellitic acid.

We claim as our invention:

1. A process for the oxidation of an alkyl-substituted aromatic compound which comprises reacting said alkyl-substituted aromatic compound with an oxygen-containing gas in the presence of a catalyst comprising a mixture of an alkali, alkaline earth or tertiary alkyl hypochlorite and a compound of a metal selected from the group consisting of manganese, cobalt, nickel, iron, vanadium, titanium, molybdenum and tungsten, and recovering the resultant oxygenated aromatic compounds.

2. The process as set forth in claim 1 in which the reaction conditions include a temperature in the range of from about 100° to about 250° C. and a pressure in the range of from about 250 to about 2,000 pounds per square inch.

3. The process as set forth in claim 1 further characterized in that said reaction is effected in the presence of a solvent.

4. The process as set forth in claim 1 in which said catalyst is a mixture of cobalt acetate and aqueous sodium hypochlorite.

5. The process as set forth in claim 1 in which said catalyst is a mixture of manganese benzoate and calcium hypochlorite.

6. The process as set forth in claim 1 in which said oxygen-containing gas is air.

7. The process as set forth in claim 1 in which said oxygen-containing gas is oxygen.

8. The process as set forth in claim 1 in which said alkyl-substituted aromatic compound is toluene and said oxygented aromatic compounds are a mixture of benzaldehyde, benzyl alcohol and benzoic acid.

9. The process as set forth in claim 1 in which said alkyl-substituted aromatic compound is p-xylene and said oxygenated aromatic compounds are a mixture of terephthalic acid, terephthalaldehyde, p-toluic acid, p-tolualdehyde, and p-methylbenzyl alcohol.

10. The process as set forth in claim 1 in which said alkyl-substituted aromatic compound is pseudocumene and said oxygenated aromatic compounds are a mixture of trimellitic acid, dimethylbenzyl alcohols, 2-methylterephthalaldehyde, 2-methylterephthalic acid, 4-methylphthalic acid, 2,4-dimethylbenzoic acid, 3,4-dimethylbenzoic acid and 2,5-dimethylbenzoic acid.

11. The process as set forth in claim 1 in which said alkyl-substituted aromatic compound is 1-methylnaphthalene and said oxygenated aromatic compounds are a mixture of 1-naphthoic acid, 1-naphthaldehyde, 1-hydroxymethylnaphthalene, phthalic acid and hemimellitic acid.

References Cited

UNITED STATES PATENTS

| | | | |
|---|---|---|---|
| 2,963,509 | 12/1960 | Barker et al. | 260—524 |
| 3,007,942 | 11/1961 | Burney et al. | 260—524 |
| 2,999,879 | 9/1961 | Broich et al. | 260—524 |

LORRAINE A. WEINBERGER, Primary Examiner

R. D. KELLY, Assistant Examiner

U.S. Cl. X.R.

260—599, 618c